United States Patent [19]

Sorimachi et al.

[11] Patent Number: 4,595,823

[45] Date of Patent: Jun. 17, 1986

[54] THERMAL PRINTING HEAD WITH AN ANTI-ABRASION LAYER AND METHOD OF FABRICATING THE SAME

[75] Inventors: Haruo Sorimachi, Tokyo; Kiyoshi Satoh, Kawasaki; Takumi Suzuki, Yokohama, all of Japan

[73] Assignee: Fujitsu Limited, Kanagawa, Japan

[21] Appl. No.: 590,887

[22] Filed: Mar. 19, 1984

[30] Foreign Application Priority Data

Mar. 17, 1983 [JP] Japan .................................. 58-44781

[51] Int. Cl.[4] .......................... G01D 15/10; B47J 3/20

[52] U.S. Cl. .................................... 219/216; 219/543; 346/76 PH

[58] Field of Search .......................... 219/216 PH, 543; 346/76 PH; 400/120; 357/52

[56] References Cited

U.S. PATENT DOCUMENTS

| | | | |
|---|---|---|---|
| 4,241,103 | 12/1980 | Ohkubo | 219/216 PH |
| 4,259,564 | 3/1981 | Ohkubo | 219/216 |

FOREIGN PATENT DOCUMENTS

| | | | |
|---|---|---|---|
| 137207 | 8/1979 | Fed. Rep. of Germany . | |
| 2920446 | 11/1979 | Fed. Rep. of Germany . | |
| 54-128350 | 10/1979 | Japan | 400/120 |
| 55-39382 | 3/1980 | Japan | 400/120 |
| 56-46776 | 4/1981 | Japan | 400/120 |
| 56-154073 | 11/1981 | Japan | 346/76 PH |
| 57-20374 | 2/1982 | Japan | 400/120 |
| 57-57676 | 4/1982 | Japan | 400/120 |

*Primary Examiner*—Clarence L. Albritton
*Assistant Examiner*—Teresa J. Walberg
*Attorney, Agent, or Firm*—Staas & Halsey

[57] ABSTRACT

Cracks in an $Ta_2O_5$ anti-abrasion layer of a thermal printing head resulting from the crystallization of the $Ta_2O_5$ in the layer, are suppressed by the addition of $SiO_2$ to the layer. The anti-abrasion layer is provided as a uniform mixture of $Ta_2O_5$ and $SiO_2$ throughout the layer by sputtering a target composed of a mixture containing tantalum and silicon ingredients onto an antioxidation layer. The thermal printing head is also subjected to annealing to stabilize the resistivity of the heating elements.

6 Claims, 13 Drawing Figures

THERMAL PRINTING HEAD WITH AN ANTI-ABRASION LAYER AND METHOD OF FABRICATING THE SAME

BACKGROUND OF THE INVENTION

1. Field of the Invention

This invention relates to a thermal printing head for a thermal printer and to an anti-abrasion layer formed as an uppermost or outer layer for protecting heating elements and electrodes from abrasion type wear during contact with print paper or an ink ribbon. More specifically, this invention relates to improvement in the anti-abrasion layer adaptable for high speed printing.

2. Description of the Prior Art

Non-impact thermal printers have the beneficial features of silent, relatively high speed and high dot density printing operation. These type printers also allow a compact and low cost design as compared to other non-impact printers employing laser or ink jet technologies.

Letters or graphic patterns are formed as black or colored dots developed on thermosensitive paper or ordinary paper, as illustrated in prior art FIG. 1. When printing paper 1 is fed between thermal printing head 2 and platen 3, fine or very small heating elements 4, disposed on a substrate 5 and arranged horizontally in a line, are selectively supplied with electric current usually in the form of pulsed signals. These elements 4 heat the paper 1 or ink ribbon (not shown). As a result, a specified number of black or colored dots in a horizontal line are generated on the paper 1. Thus, letters (for example, A and B in FIG. 1) or graphic patterns are created as the paper is fed.

FIG. 2 is a cross-sectional view of a thermal printing head, including an insulating substrate 5 such as an alumina ($Al_2O_3$) ceramic and a temperature insulating glaze layer 6, formed on the substrate for preventing heat loss through the substrate 5. A heating element layer 7 is formed on the glaze 6, usually as a thin film of a material such as a tantalum nitride ($Ta_2N$), and conductors 8, 9 and 9' are formed on the heating element layer 7, except at the specified portions (see R and R'' in FIG. 2), to supply the portions R and R' with electric power. An anti-oxidation layer 10 for protecting the heating element layer 7 from oxidation is formed on the conductors 8 and 9 and the exposed portion of heating layer 7, and an anti-abrasion layer 11 for protecting the heating elements 4 and conductors 8 and 9 from abrasion caused by friction with the print paper or the ink ribbon (i.e. a thermal transfer ink ribbon) is formed on the anti-oxidation layer. Electrodes 12 are transversely formed on the electrode 8 with the interposition of insulating layer 13 therebetween, and specified electrodes 12 are connected to corresponding conductors 8 via a through-hole. A diode 14 is used as a gate device for the electric current supplied to the heating element 4, and is formed between electrodes 9 and 9'.

FIG. 3 is an enlarged perspective view of heating elements 4 and electrodes 8 and 9, which are disposed side by side in a row on a substrate (not shown). FIG. 4 is a cross-sectional view of FIG. 3 along the line X-Y in FIG. 3 where like reference numerals designate like or corresponding parts throughout. As illustrated by FIG. 4, the surface of anti-abrasion layer 11 is always subject to friction caused by the printing paper 1 as it is fed past the head, and thus causes abrasion of the layer 11. The anti-abrasion layer 11, in the prior art, is generally tantalum pentaoxide ($Ta_2O_5$), because of its excellent abrasion resistance and ability to adhere to other materials of the printing head. However, $Ta_2O_5$ does not protect the heating elements 4 from oxidation during normal operation. Therefore, it is necessary to provide an anti-oxidation layer 10 of $SiO_2$, for example, between the heating element 4 and the anti-abrasion layer 11, when the heating elements 4 are made of a material such as $Ta_2N$, for example, whose oxidation resistance is relatively low.

Recent high speed operating requirements for thermal printers, require energization of the heating elements using narrow width electric pulses such as pulses of 1 millisecond (ms) in width, as compared with 2 to 3 ms in conventional thermal printers. Such high speed operation frequently causes cracks in the anti-abrasion layer 11. The cracks usually extend to the surface of the heating elements, even through the anti-oxidation layer 10 provided between the heating elements 4 and the anti-abrasion layer, thereby allowing the heating elements to be exposed to the air. As a result, the heating elements are oxidized as they are heated, and the actual operational life of a thermal printing head is shorter than the expected life. The life of a thermal printing head, as shortened by such cracks, is occasionally as short as one hundredth that associated with the life of the head when abrasive wearing is the failure mode.

In the prior art thermal printer technology, the occurrence of the cracks in the anti-abrasion layer 11 has been attributed to stress caused by thermal shock when the pulsed type electric power is applied to the heating elements 4. Therefore, improvements directed at preventing the cracks have been focused on providing an anti-abrasion layer 11 subject to reduced stress. Some proposed techniques are disclosed in Japanese patent applications: Tokukai-Shou Nos. 56-145072 to 56-154075, all published Nov. 28, 1982. The concept advanced by these disclosures is to form an anti-abrasion layer in which the chemical composition is not uniform across its thickness. For example, when an anti-abrasion layer is formed of $Ta_2O_5$ and silicon dioxide ($SiO_2$), $Ta_2O_5$, which is a hard component, is richer in near a surface region, while $SiO_2$, which is a soft component, is richer in or near an underlying region. Such a composition change is created using a continuous variable composition layer or discontinuous multiple layers each of which differs in composition. The thermal printing head described in the above references does not include an anti-oxidation layer and the variable ratio mixture anti-abrasion layer described therein also acts as an anti-oxidation layer. The references particularly state that an anti-oxidation layer is not needed.

The above-mentioned techniques require complicated process control and a special apparatus for fabricating the anti-abrasion layer, and thus when using these techniques it is hard to provide low cost thermal printing heads.

SUMMARY OF THE INVENTION

It is an object of the present invention to provide a low cost thermal printing head.

It is another object of the present invention to provide a thermal printing head applicable to high speed printing.

It is still another object of the present invention to provide a thermal printing head having a long operational life.

It is a further object of the present invention to provide a method for fabricating a thermal printing head having an anti-abrasion layer which is hard to crystallize even under high speed operating conditions.

It is a still further object of the present invention to provide a method for fabricating a thermal printing head having heating elements with stabilized resistivity.

These objects can be accomplished by fabricating an anti-abrasion layer in the form of a unifcrm mixture including $Ta_2O_5$ as the chief component and $SiO_2$ as a subcomponent, both being in a uniform single layer. The layer is deposited by sputtering a target comprising a mixture containing tantalum and silicon in a specified range of mixture content onto an anti-oxidation layer and annealing the heating elements by supplying them with a specified amount of electric power.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

According to an experimental investigation by the inventors, cracks in an anti-abrasion layer composed of $Ta_2O_5$ result from the crystallization of $Ta_2O_5$ in the layer, and the crystallization is accelerated during high speed operating conditions. In addition, it was discovered that only when the anti-abrasion layer is free from cracks, can the heating elements be annealed properly to stabilize their resistivity. Therefore, the present invention prevents crystallization in the anti-abrasion layer which may be a uniform single layer. The thermal printing head of the present invention also includes an anti-oxidation layer selected from among silicon nitride ($Si_3N_4$), silicon oxynitride, silicon dioxide ($SiO_2$), alumina ($Al_2O_3$) and borosilicate glass with the first three compounds being particularly suitable.

Figure 5:
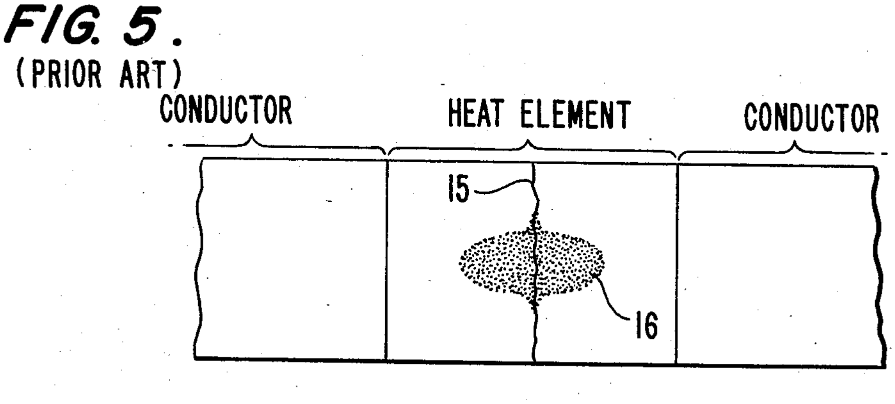
FIG. 5. (PRIOR ART)
FIG. 5 is a schematic diagram of a typical crack that has developed in an anti-abrasion layer.

FIG. 5 is a schematic diagram of an optical microscopic view of a typical crack 15 and an opaque region 16, both observed in a $Ta_2O_5$ anti-abrasion layer in a thermal print head heating element portion.

Figure 6:
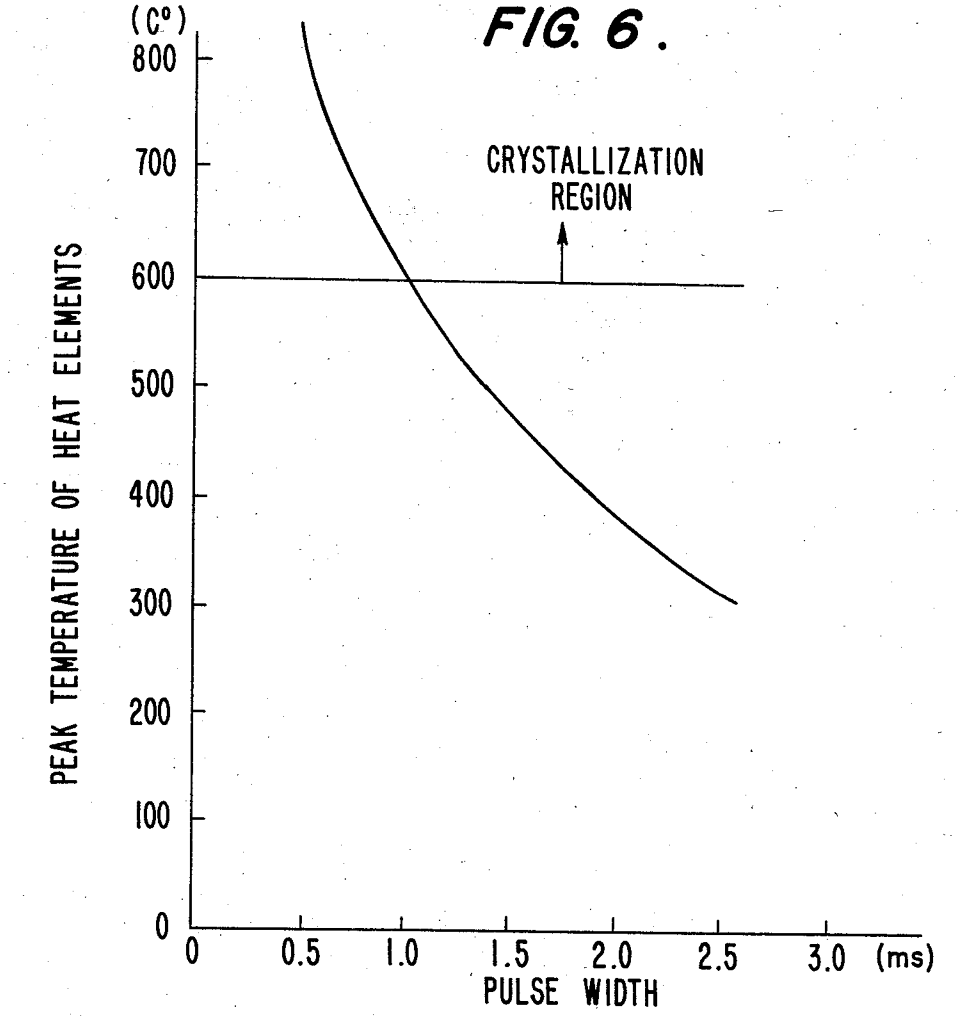
FIG. 6 is a graph of the relationship between the peak temperature of the heating elements and the width of an electric pulse supplied to the heating elements.

To generate print dots having a specific color density a specific level of energy must be applied to the heating elements. As a result the narrower the width of the pulses in pulsed electric current, when the energy applied is kept constant, the higher the peak temperature of the heating elements. FIG. 6 is a graph of the relationship between the peak temperature of a heating element and the width of electric pulses supplied to the heating elements at constant power input of 40 millijoules/pulse/$mm^2$ (this energy unit will be abbreviated mj/$mm^2$ hereinafter) and with a repetition period of 10 milliseconds (ms). The crack 15 generally occurs in the region of the graph where the pulse width is less than 1 ms, and are always accompanied by the opaque region 16 shown in FIG. 5. Observation of the opaque region 16 using a polarized microscope indicates that crystals have formed in the opaque region 16. These facts suggest that the cracks result from crystallization of the $Ta_2O_5$ anti-abrasion layer. It was also found experimentally that crystallization of the anti-abrasion layer is accelerated when the temperature is higher than 600° C.

Figure 7A:
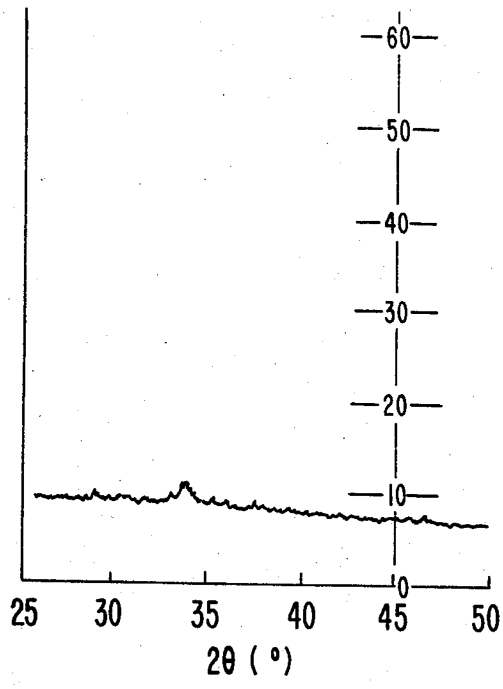
FIGS. 7(*a*) and 7(*b*) are examples of X-ray spectra taken for a $Ta_2O_5$ anti-abrasion layer formed by sputtering.
Figure 7B:
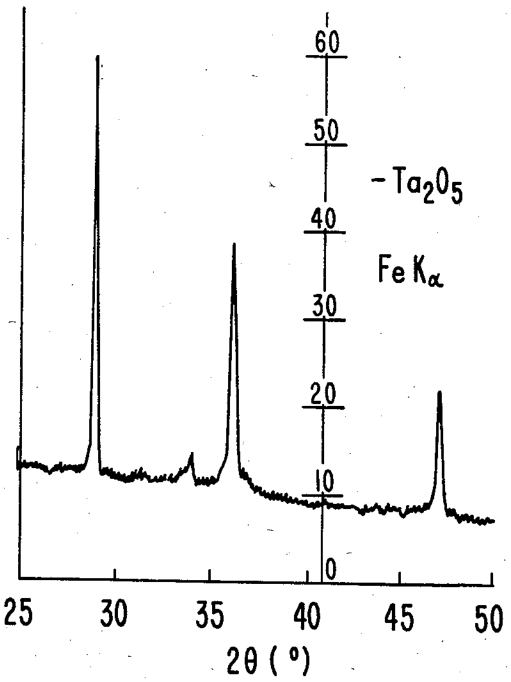

FIG. 7(*a*) and 7(*b*) are representations of X-ray spectra of a $Ta_2O_5$ layer formed using a sputtering method, where FIG. 7(*a*) depicts the layer as sputtered and FIG. 7(*b*) depicts the layer after it was subjected to a heat treatment at 700° C. for 10 hours. The peaks in FIG. 7(*b*) correspond to the (001), (100), and (101) planes of $Ta_2O_5$ crystals using the Miller indices, respectively. This X-ray diffraction analysis reveals that the as-sputtered $Ta_2O_5$ layer is almost amorphous and that the layer has been subtantially crystallized after the heating at 700° C.

As the crystal grains grow in the anti-abrasion layer, we theorize that the tear strength of the layer is reduced, and that a crack originates at the weakest grain boundary, when the layer is subjected to tensile stress. Tensile stress may be caused by different rates of thermal expansion between the anti-abrasion layer and the underlying layers (mainly the glaze layer), when the heating elements generate heat. These cracks eventually will extend across the entire layer. Based on our theory the cracks are hard to thermally originate in the anti-oxidation layer of $SiO_2$ film because it is sufficiently thermally stable to maintain its amorphous state. However, a crack that originates in the $Ta_2O_5$ anti-abrasion layer can spread into the $SiO_2$ anti-oxidation layer and finally reach the surface of the heating element. Therefore, once a crack originates in the anti-abrasion layer, the anti-oxidation layer eventually no longer effectively protects the heating elements from oxidation. In other words, if the anti-abrasion layer can be prevented from crystallizing, and thus from developing cracks, the heating elements can be kept from oxidizing.

The present invention provides an anti-abrasion layer that does not crystallize due to the heat generated by the heating elements, even during high speed heating element operating conditions which result in a high peak temperature. The present invention is based on the idea that crystallization can be suppressed by the addition of an anti-crystallization subcomponent to the $Ta_2O_5$ anti-abrasion layer, and $SiO_2$ has been selected as the subcomponent. $SiO_2$ is effective because its stable amorphous state is maintained even after heat treatment and it also helps provide strong adhesion to the underlying $SiO_2$ anti-oxidation layer. Therefore, it will be obvious to those of skill in the art that a portion of the $SiO_2$ can be replaced by one or more other subcomponents which are also effective in suppressing the crystallization in the $Ta_2O_5$ anti-abrasion layer.

A preliminary crystallization examination was conducted on five specimens, each having a multilayer structure similar to that in an actual thermal printing head, however the conductor layer was eliminated. Namely, the following layers were formed one after another on a glazed alumina substrate using a known sputtering method: a 500 Å thickness tantalum nitride ($Ta_2N$) layer, a 1 micrometer thick $SiO_2$ layer, and a 4 micrometer thick $Ta_2O_5$-$SiO_2$ mixture layer. The amount of $SiO_2$ in the $Ta_2O_5$-$SiO_2$ layer was changed for each specimen with the 5, 10, 20, 30, and 40 mol percent being the amounts for the five specimens, respectively. Then the specimens were subjected to a heat treatment at successive temperatures of 600°, 650°, 700°, 750°, and 800° C. for 10 hours at each temperature. According to an X-ray analysis of the specimens, no crystallization of the $Ta_2O_5$ was observed in the $Ta_2O_5$-$SiO_2$ layer containing $SiO_2$ more than 20 mol percent after a heat treatment up to 800° C., and no crystallization occurred in the layers containing 5 and 10 mol percent $SiO_2$ up to 700° C. During high temperature heating, no cracks originated in the layers. However, when heated at a temperature above 700° C., the layers having 5 and 10 mol percent produced $Ta_2O_5$ crystals.

Figure 8A:
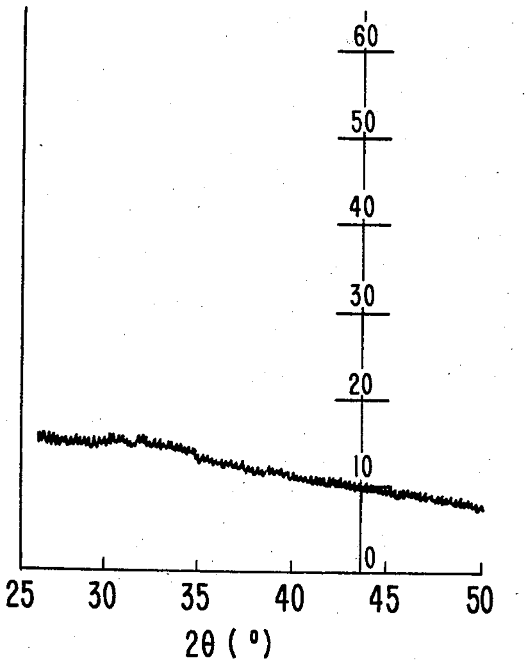
FIG. 8(*a*) and 8(*b*) are X-ray spectra taken for an $Ta_2O_5$-$SiO_2$ anti-abrasion layer formed by sputtering a target composed of 80 mol percent $Ta_2O_5$ and 20 mol percent $SiO_2$.
Figure 8B:
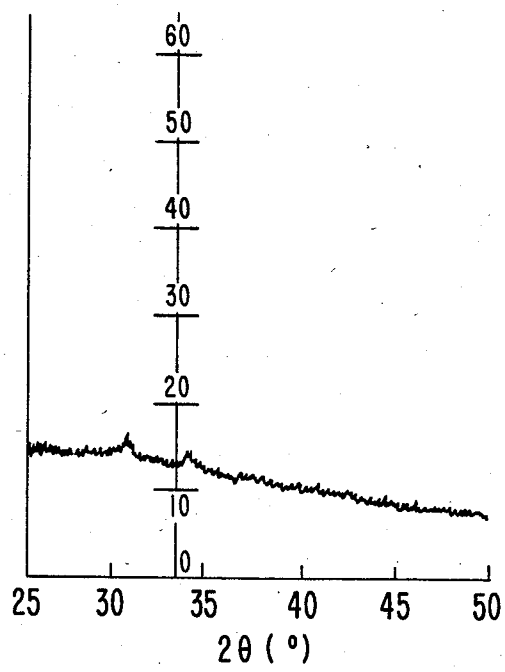

FIGS. 8(*a*) and 8(*b*) are representations of X-ray spectra of a $Ta_2O_5$-$SiO_2$ mixture layer containing 20 mol percent of $SiO_2$, where the layer was formed using a known sputtering method as described above, and where FIG. 8(*a*) depicts the layer as sputtered and FIG. 8(*b*) depicts the layer after it was subjected to heat treatment at 700° C. for 10 hours. By comparing FIG. 8(*b*) with FIG. 7(*b*), it is apparent that crystallization of the $Ta_2O_5$, represented by peaks corresponding to the planes (001), (100) and (101), has been substantially suppressed by the addition of the $SiO_2$.

Figure 1:
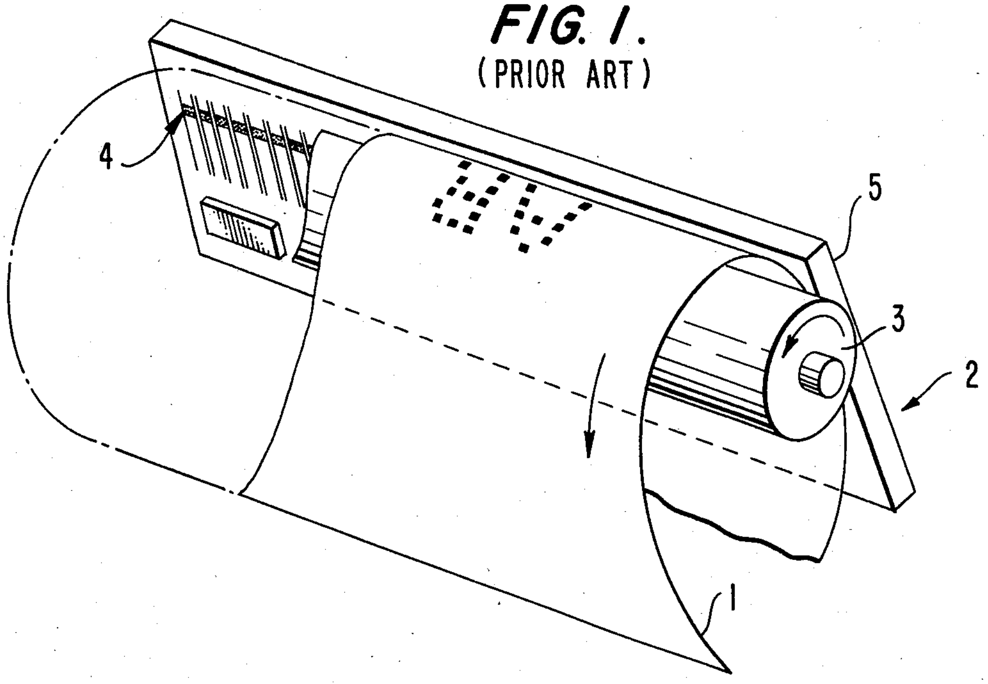
FIG. 1. (PRIOR ART)
FIG. 1 is a diagram of the principles of operation and major components of a thermal printer.
Figure 2:
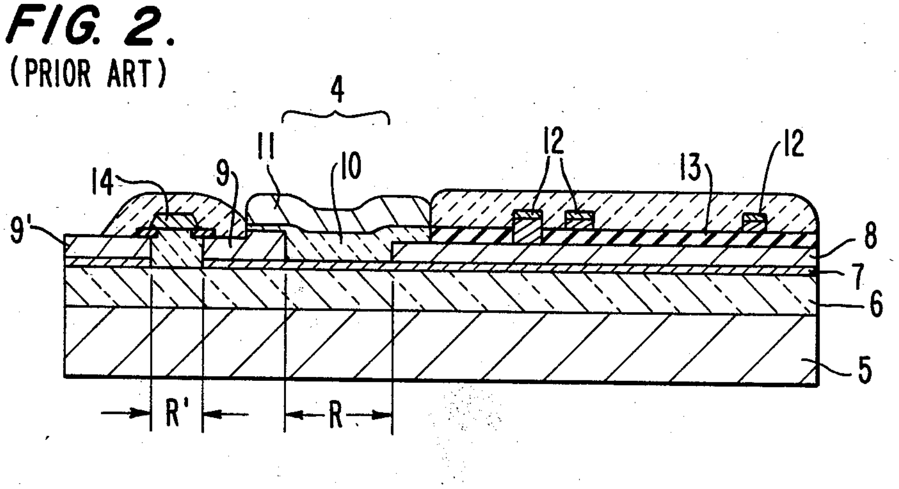
FIG. 2. (PRIOR ART)
FIG. 2 is a cross-sectional view of the thermal printing head in FIG. 1.
Figure 3:
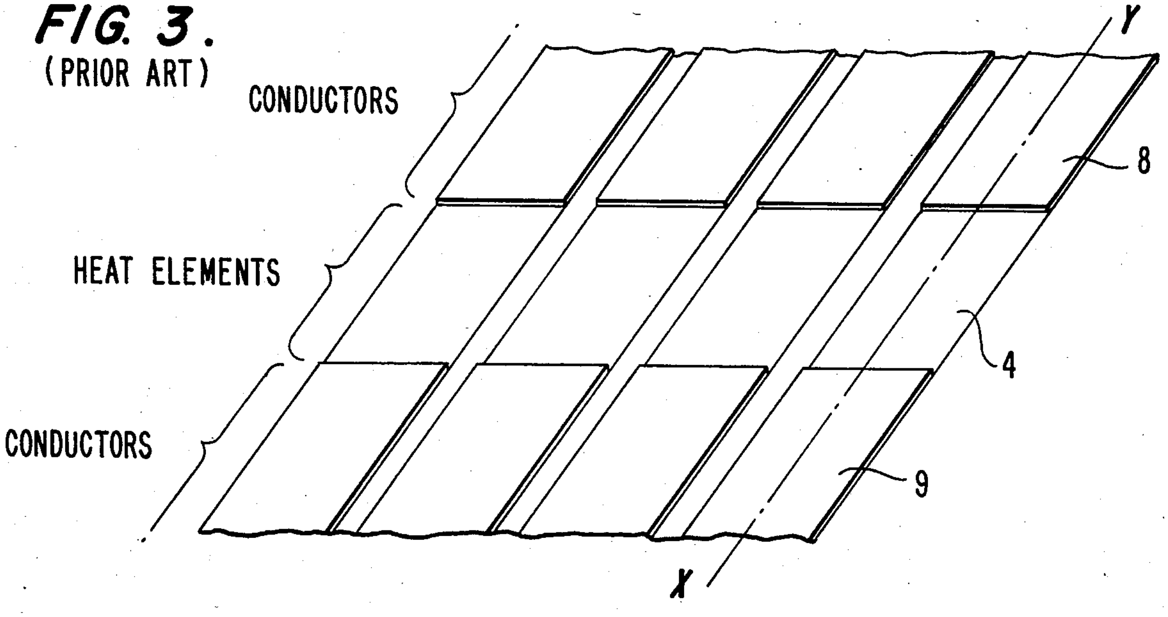
FIG. 3. (PRIOR ART)
FIG. 3 is a perspective view of arrayed heating elements and conductors.
Figure 4:
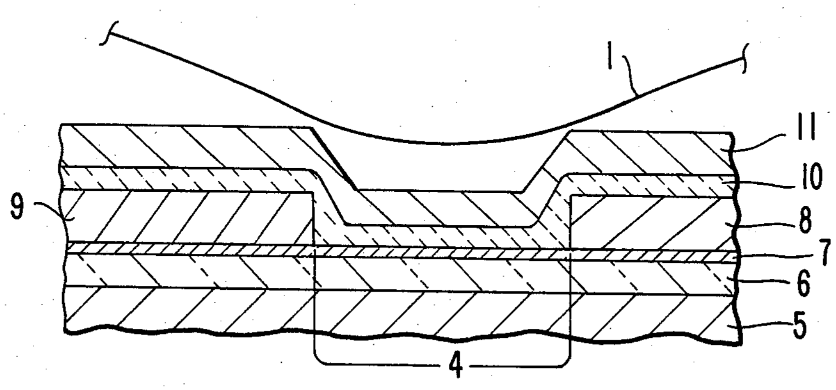
FIG. 4. (PRIOR ART)
FIG. 4 is a cross-sectional view of a heating element along the line X-Y in FIG. 3.

Based on the results of the above-described preliminary experiment, four thermal printing heads having the same structure as shown in FIG. 2 were fabricated using known thermal head fabrication processes. The printing head anti-abrasion layers were composed of a uniform mixture of $Ta_2O_5$ and $SiO_2$, where the content or amount of the $SiO_2$ in the layers varied between the types.

The head fabrication process was as follows:

(1) A 500 Å thickness tantalum nitride ($Ta_2N$) heating element layer was formed on a glazed alumina substrate using a known sputtering method.

(2) A conductor layer comprising layers of 500 Å NiCr, 3500 Å Au and 300 Å Cr was subsequently formed on the $Ta_2N$ layer by use of a known vacuum evaporation method (3) The $Ta_2N$ heating element layer and the conductor layer was then conventionally etched to form stripes having a width of 0.1 millimeters using a conventional photolithographic method.

(4) Each of the conductor layer stripe was then etched in the heating element area of each $Ta_2N$ layer stripe using the conventional photolithographic method, thereby completing the heating elements and their lead conductors.

(5) A 1 micrometer thick $SiO_2$ anti-oxidation layer was formed on the exposed portion of $Ta_2N$ layer stripes (i.e. the heating elements) using a conventional mask sputtering method.

(6) A 4 micrometer thick $Ta_2O_5$-$SiO_2$ anti-abrasion layer was formed on the $SiO_2$ anti-oxidation layer using a conventional mask sputtering method. In this experiment, four different sputtering targets comprising a mixture of $Ta_2O_5$ and $SiO_2$ were employed to obtain the $Ta_2O_5$-$SiO_2$ layer resulting in four different anti-abrasion layers each having a different $SiO_2$ content. The content of the $SiO_2$ the targets were 0, 10, 20, and 30 mol percent, respectively.

Figure 9:
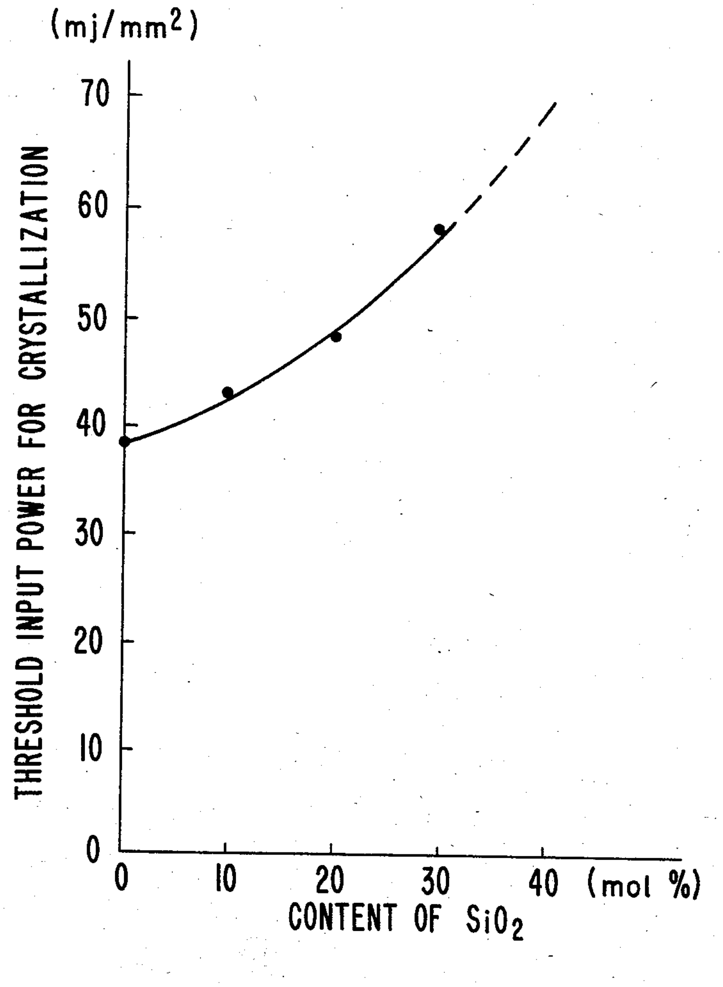
FIG. 9 is a graph of the relationship between the content of $SiO_2$ in a $Ta_2O_5$-$SiO_2$ anti-abrasion layer and the threshold electric power applied to the heating elements to begin crystallization in the anti-abrasion layer.

Each of these four thermal printing heads was operated using a pulsed current of various power densities (in mj/mm$^2$), and the threshold power density necessary to begin crystallization in the anti-abrasion layer was determined. The width and repetition period of the electric pulses were 1 ms and 10 ms, respectively. The input power density was increased from 35 mj/mm$^2$ in a step by step fashion and the duration time at each power density was $1\times10^8$ pulses (equivalent to $1.67\times10^4$ minutes). FIG. 9 is a graph of the results of this experiment showing the relationship between the content of $SiO_2$ in the $Ta_2O_5$-$SiO_2$ anti-abrasion layer and the threshold power input applied to the heating elements necessary to begin crystallization in the anti-abrasion layer. By interpolating the curve of FIG. 9, it is apparent that $SiO_2$ at 5 to 10 mol percent in the anti-abrasion layer is also effective to suppress the crystallization caused by a power of approximately 40 mj/mm$^2$ applied to a pure $Ta_2O_5$ layer. FIG. 9 also shows that the $Ta_2O_5$-$SiO_2$ anti-abrasion layer containing 20 mol percent $SiO_2$ does not crystallize when the power applied is up to about 50 mj/mm$^2$ with a pulse width of 1 ms.

Since it can be assumed that the peak temperature of the heat elements is proportional to the input power, by referring back to FIG. 6, it can be determined that a 50 mj/mm$^2$ input power will result in a peak temperature of 750° C. for the heating elements. Therefore, the $Ta_2O_5$-$SiO_2$ anti-abrasion layer containing 20 mol percent $SiO_2$ is applicable to high density printing requiring an input power of up to approximately 50 mj/mm$^2$, where the pulse width is 1 ms, and also to a high speed printing operating having a pulse width more than approximately 0.6 ms where the input power density is 40 mj/mm$^2$. Even when the content of $SiO_2$ is little as 5 mol percent, the anti-abrasion layer is useful for a high speed opertion having a pulse width of around 1 ms.

To prevent cracks in the anti-abrasion layer as much as possible, it is preferable to increase the content of $SiO_2$ in a $Ta_2O_5$-$SiO_2$ anti-abrasion layer, however, the increase of the $SiO_2$ decreases the anti-abrasion capability of the layer, which requires a tradeoff between crack prevention and abrasion prevention.

Figure 10:
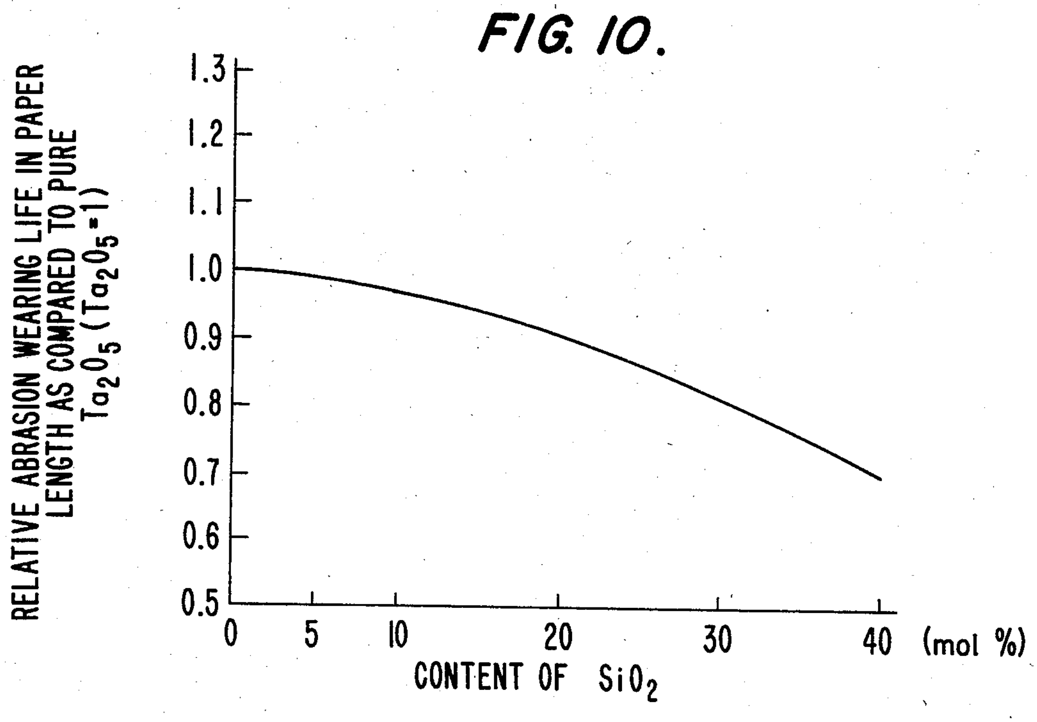
FIG. 10 is a graph of the change in abrasion wearing life of the $Ta_2O_5$-$SiO_2$ layer as a function of the $SiO_2$ content in the layer.

FIG. 10 is a graph of the change in abrasion wearing life of the $Ta_2O_5$-$SiO_2$ layer as a function of $SiO_2$ content in the layer. The abrasion life is defined in terms of the ratio of total length of printing paper necessary to wear out each $Ta_2O_5$-$SiO_2$ anti-abrasion layer to the total length of paper necessary to wear out the same thickness of a pure $Ta_2O_5$ anti-abrasion layer. The abrasion life of the pure $Ta_2O_5$ layer is about 30 kilometers (km) per micro-meter thickness. As depicted in FIG. 10, the abrasion wearing life is decreased as the $SiO_2$ content is increased, however, but the decrease is less than 20 percent, if the $SiO_2$ content is kept less than 30 mol percent. Even though an approximately 30 percent decrease in the abrasion wearing life is observed when the $SiO_2$ content is 40 mol percent, a 70 percent abrasion life is sufficient when compared to the thermal wearing life of a pure $Ta_2O_5$ anti-abrasion layer. According to the above embodiment, the addition of $SiO_2$ to the $Ta_2O_5$ anti-abrasion layer in the range from 5 to 40 mol percent, preferably from 10 to 30 mol per cent provides a head life which is acceptably long.

In a thermal printing head having heating elements of resistive materials such as $Ta_2N$, the resistivity of the heating elements usually decreases as the operational time increases. However, when a conventional thermal printing head, as previously described, is operated using narrow pulse width electric current, such as a pulse width of 1 ms, the resistivity of the heating elements abruptly increases and the head becomes inoperable within a relatively short period of time. This is, as mentioned earlier, due to the oxidation of the heating elements, which takes place when cracks originate in the anti-abrasion layer. When the anti-abrasion layer is prevented from cracking, the abrupt resistivity increase does not appear during extended operation and the resistivity tends to stabilize at a minimum value.

Figure 11:
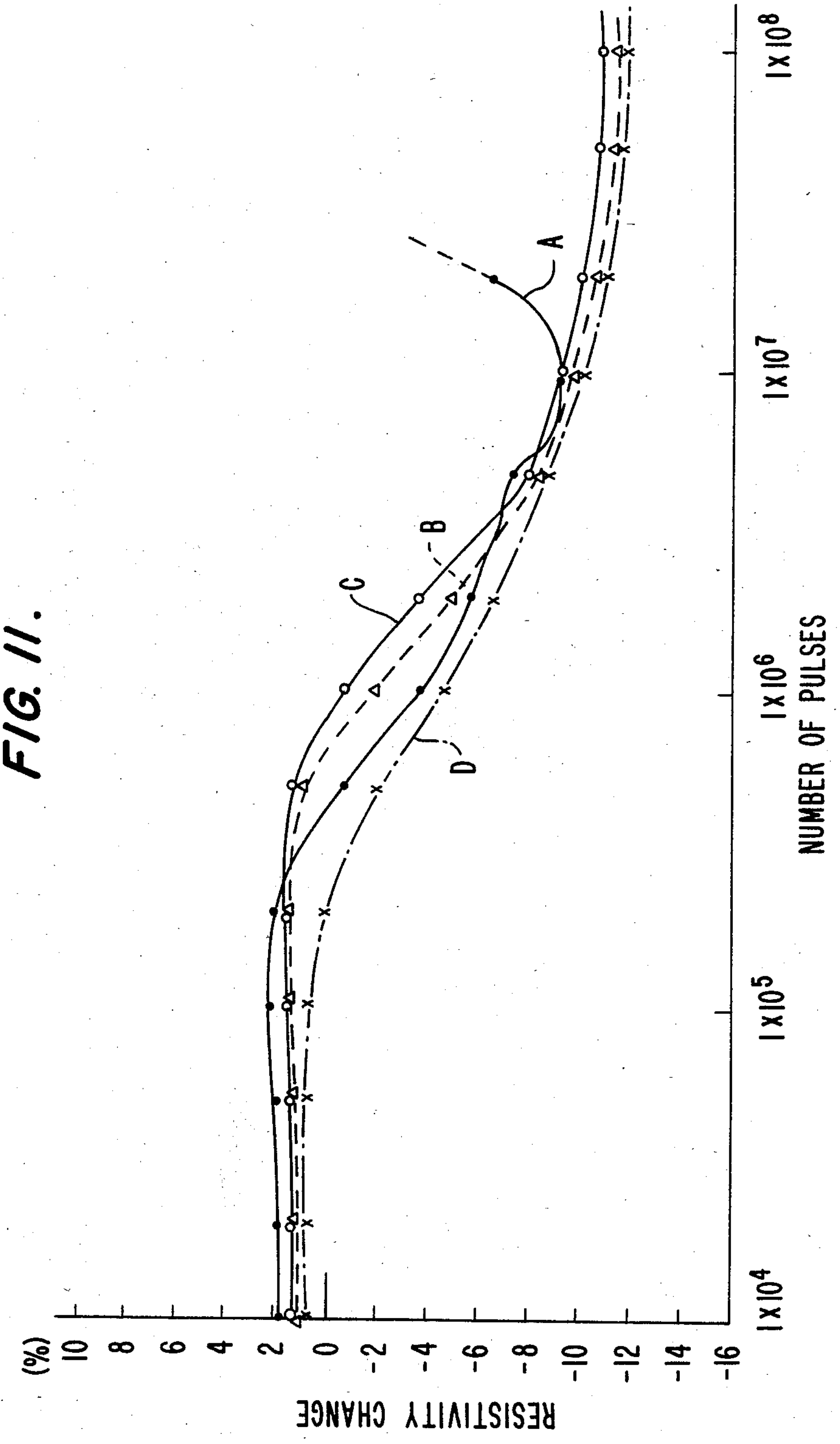
FIG. 11 is a graph of the resistivity changes of heating elements versus the number of operation cycles in several thermal printing heads where the $SiO_2$ content in the anti-abrasion layers differ.

FIG. 11 is a graph of the resistivity changes in thermal printing heads during the operational period. The anti-abrasion layers of the printing heads were formed by sputtering targets composed of a mixture of $Ta_2O_5$ and $SiO_2$, the mixture being different in $SiO_2$ content between heads. In FIG. 11 the ordinate represents the relative resistivity change in the heating elements as compared to its initial value as a percentage, while abscissa represents operational time in terms of the number of electric pulses supplied to the heating elements. The power density, width, and repetition period of the electric pulses were 40 $mj/mm^2$, 1 ms, and 10 ms, respectively. The curve A is for a printing head whose $SiO_2$ content in the anti-abrasion layer is 0 (pure $Ta_2O_5$ anti-abrasion layer). The curves B, C, and D correspond to the resistivity changes in the printing heads whose $SiO_2$ contents are 10, 20 and 30 mol percent respectively. As illustrated by the curve A, a steep increase in the resistivity of the pure $Ta_2O_5$ head is observed after the supply of approximately $10^7$ pulses which is equivalent to an operating period of about 30 hours. In other words, if printing is carried out at a density of 4 dots/mm (100 dots/inch) in the feeding direction, the printing head experiences excessive thermal wearing after a paper length of 2.5 km ($2.7\times10^3$ yards) is printed. As mentioned above, the abrasion wearing life of a pure $Ta_2O_5$ anti-abrasion layer is about 30 km per micrometer of thickness (in an actual thermal printing head, the thickness of the anti-abrasion layer is a few micrometers), therefore the thermal wearing life of the pure $Ta_2O_5$ anti-abrasion layer is less than a tenth of the abrasion wearing life.

If $SiO_2$ is added to a $Ta_2O_5$ anti-abrasion layer, the cracks in the layer are suppressed, and oxidation of the heating elements is prevented. As a result, the thermal wearing life of a thermal printing head under high speed operating conditions is extended more than 10 fold as compared to abrasion wearing life, as shown by the curves B, C, and D in FIG. 11. The resistivity of the heating elements in each of the curves B, C and D tends to approach a minimum after the elements are supplied with about $10^7$ pulses. This phenomenon occurs because the heating element layer is composed of a resistive material such as $Ta_2N$ which is annealed by the heat created by the supply of electric current to the elements, and inherent defects and strains are removed and the resistivity of the layer is thus stabilized. The present invention not only improves the operational life of a thermal printing head but also provides stable resistivity characteristics for a thermal printing head.

It is difficult to define the annealing conditions of the heating elements in general, since the speed and amount of the resistivity change differs according to the material used and the fabrication process for the heating element. However, for the $Ta_2N$ heating elements employed in this embodiment, of which the resistivity decrease levels off at about 12 percent within a relatively short period as shown in FIG. 11, it is possible to set a standard in which the annealing should be performed to cause a resistivity decrease of 8 to 10 percent of its initial value, and the electric current supplied should be in the range from 30 to 50 $mj/mm^2$.

The many features and advantages of the invention are apparent from the detailed specification and thus it is intended by the appended claims to cover all such features and advantages thereof which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. It is obvious to those skilled in the art that a part of the $SiO_2$ in the $Ta_2O_5$-$SiO_2$ anti-abrasion layer may be replaced by another component which will suppress crystallization of $Ta_2O_5$ in the layer, such as silicon monoxide (SiO) or silicon nitride ($Si_3N_4$) or some other impurity that supporesses crystallization, and the source of tantalum and/or silicon in the target for forming $Ta_2O_5$-$SiO_2$ anti-abrasion layer need not be in an oxidized state, but may be in a metallic state and is sputtered in an oxidizing atmosphere to form a mixture of $Ta_2O_5$ and $SiO_2$. In addition, other anti-abrasion compounds such as silicon carbide (SiC) or silicon nitride can be used, however, these compounds crack more easily than $Ta_2O_5$.

We claim:

1. A thermal printing head, comprising:

a substrate;

heating elements formed on said substrate;

conductors formed on and contacting said heating elements;

an anti-oxidation layer covering said heating elements and said conductors; and an anti-abrasion layer formed over said anti-oxidation layer, said anti-abrasion layer comprising a uniform mixture of a tantalum pentaoxide anti-abrasion compound and a silicon dioxide anti-crystallization compound.

2. A thermal printing head as recited in claim 1, wherein content of said tantalum pentaoxide in said anti-abrasion layer is more than sixty percent in mol ratio.

3. A thermal printing head as recited in claim 1, wherein content of said silicon dioxide in said anti-abrasion layer is less than forty percent in mol ratio.

4. A thermal printing head as recited in claim 1, wherein content of said silicon dioxide in said anti-abrasion layer is in a range from ten through thirty percent in mol ratio.

5. A thermal printing head as recited in claim 1, wherein said anti-oxidation layer is selected from a group consisting of silicon dioxide, silicon oxynitride and silicon nitride.

6. A thermal printing head, comprising:

a substrate;

a heating element formed on said substrate;

conductors formed on and contacting said heating element; and an anti-abrasion layer formed over said heating element and said conductors, said anti-abrasion layer comprising a uniform mixture throughout its thickness of an anti-abrasion compound and an anti-crystallization compound.

* * * * *